United States Patent
Weber

(10) Patent No.: US 7,357,249 B1
(45) Date of Patent: Apr. 15, 2008

(54) OPTICAL DISC STACKED REMOVABLE LABEL MARKETING SYSTEM

(76) Inventor: Warren D. Weber, 10665 NE. 4th St., Suite 810, Bellevue, WA (US) 98004

( * ) Notice: Subject to any disclaimer, the term of this patent is extended or adjusted under 35 U.S.C. 154(b) by 177 days.

(21) Appl. No.: 11/253,213

(22) Filed: Oct. 18, 2005

Related U.S. Application Data

(60) Provisional application No. 60/620,119, filed on Oct. 18, 2004.

(51) Int. Cl.
*B65D 85/57* (2006.01)
*G09F 3/02* (2006.01)
*G09F 3/10* (2006.01)
*B42D 15/00* (2006.01)

(52) U.S. Cl. ............ 206/308.1; 40/340; 40/638; 206/459.5; 283/81; 283/101

(58) Field of Classification Search ........... 206/308.1, 206/308.2, 309–313, 459.5; 40/310, 312–313, 40/340, 638; 283/81, 101
See application file for complete search history.

(56) References Cited

U.S. PATENT DOCUMENTS

| | | | | |
|---|---|---|---|---|
| 3,107,783 A | * | 10/1963 | Corey et al. | 206/310 |
| 3,726,030 A | * | 4/1973 | Wilson | 283/81 |
| 4,124,118 A | * | 11/1978 | Helm | 206/310 |
| 4,385,460 A | * | 5/1983 | Hanna | 283/81 |
| 4,973,088 A | * | 11/1990 | Levy | 283/81 |
| 5,195,265 A | * | 3/1993 | Klingenberg | 40/638 |
| 5,597,634 A | * | 1/1997 | Bloomer et al. | 428/40.1 |
| 6,016,909 A | * | 1/2000 | Chang | 206/310 |
| 6,360,466 B1 | * | 3/2002 | Thomas, III | 40/638 |
| 6,511,731 B2 | * | 1/2003 | Clark | 40/638 |
| 7,044,296 B2 | * | 5/2006 | Solling | 206/308.2 |

* cited by examiner

*Primary Examiner*—Bryon P Gehman
(74) *Attorney, Agent, or Firm*—Dean A. Craine

(57) ABSTRACT

An optical disc media marketing system used to advertise various products or services to users of optical disc products. The system includes the use of a standard optical disc and a jewel case with a recessed cavity formed therein to receive the optical disc. If the jewel case includes a spindle post, then the system includes either a T-shaped adapter or a cap that temporarily engages or attaches to the post. If the jewel case does not include a spindle post, then a T-shaped adaptor is used that engages the inside edge of the optical disc. The T-shaped adaptor and the cap include a top surface that is slightly larger than the spindle hole thereby preventing removal of the disc from the jewel case or use on an optical disc player. Disposed over the top surface of the adaptor or cap is a stack of adhesive labels. The labels in the stack are co-axially aligned and progressively smaller in diameter from top to bottom thereby forcing the user to remove them in order from top to bottom In another embodiment, a spinning plate may be disposed between the adapter or cap that allows the labels to spin.

11 Claims, 5 Drawing Sheets

OPTICAL DISC STACKED REMOVABLE LABEL MARKETING SYSTEM

This application claims benefit of application Ser. No. 60/620,119 filed Oct. 18, 2004.

BACKGROUND OF THE INVENTION

1. Field of the Invention

This utility patent application is based on the provisional patent application (Ser. No. 60/620,119) filed on Oct. 18, 2004.

2. Description of the Related Art

Optical disc media, such as a CD, CD-R, CD-RW, DVD, DVD-R, and DVD-RW, is often shipped in a flat, plastic container called jewel case. Jewel cases typically include a top leaf and a bottom leaf pivotally connected together along one edge. Formed on the inside surface of the bottom leaf is a circular, recessed area designed to receive a standard CD or DVD disc. Formed centrally in the recessed area is an upward extending spindle or post designed to extend into the disc's spindle hole to hold the disc within the recessed area.

The post used in a jewel case is a cylindrical structure with radially aligned slots that divide the post into a plurality of longitudinally aligned sections that are biased outward to engage the inside edge of the spindle hole on a disc placed into the recessed area. Formed centrally on the post is a bore that allows the leg sections to collapse inward when the post is initially inserted into the spindle hole on the optical disc. Formed on the top edge of the leg sections are small, outward projecting lips that snap fit over the top surface of the optical disc to securely hold it in place.

The price of CD's and DVD's effects sales. Lately, the cost of preparing and distributing CD's and DVD's has substantially decreased and it is anticipated that they will continue to decrease. Because profits may be decreasing as well, disc manufacturers are interested in new ways to increase and generate new revenue. One method is to use the surface of the CD's and DVD's itself as an advertising medium without damaging the surface of the optical disc.

SUMMARY OF THE INVENTION

It is an object of the present invention to provide a new marketing system for an optical disc.

It is another object of the present invention to provide such a system that is compatible with current systems and methods used to market an optical disc.

These and other objects are met by the marketing system and method disclosed herein that uses a standard optical disc shipping inside a jewel case. The system includes the attachment of a plurality of adhesive labels that are co-axially aligned over the spindle hole of the optical disc that must be removed prior to the optical disc being used. The labels are sufficient in diameter so that it must be manipulated by the user to remove it from the optical disc.

The system includes the use of optional adaptors that physically connect the lower label on the optical disc to the post on the jewel case that extends through the optical disc when the optical disc is placed inside the jewel case. In one embodiment, the adaptor is a T-shaped structure with a narrow center stem that fits into and engages the co-axially aligned bore on the post. Attached to the center stem is a perpendicularly aligned, flat round plate that is slightly larger in diameter than the optical disc's spindle hole. The lower label in the stack of labels is slightly larger in diameter than the plate and is coaxially aligned over the disc to block the user's access to the perimeter edge of the plate. Because the center stem engages the post and because the plate is slightly larger than the spindle hole, the user must first individually remove the labels from the stack of labels before accessing the perimeter edge of the plate. Once the last label has been removed, the edge of the plate may be grasped to remove the adapter from the post and allow the disc to be removed from the jewel case.

In a second embodiment, the T-shaped adaptor uses a smaller diameter stem that fits tightly into the spindle hole formed on the spindle post.

In a third embodiment, the system includes stacked labels and a cap that replaces the above described adaptors. The cap physically or adhesively engages the top section or surface of the post device. The outside diameter of the cap is slightly larger than the hole thereby temporarily preventing removal of the optical disc until the cap is first removed.

In a fourth embodiment, the system includes an adaptor or cap with a top rotating plate upon which the layer of stacked labels are attached.

DESCRIPTION OF THE PREFERRED EMBODIMENT(S)

Figure 1:
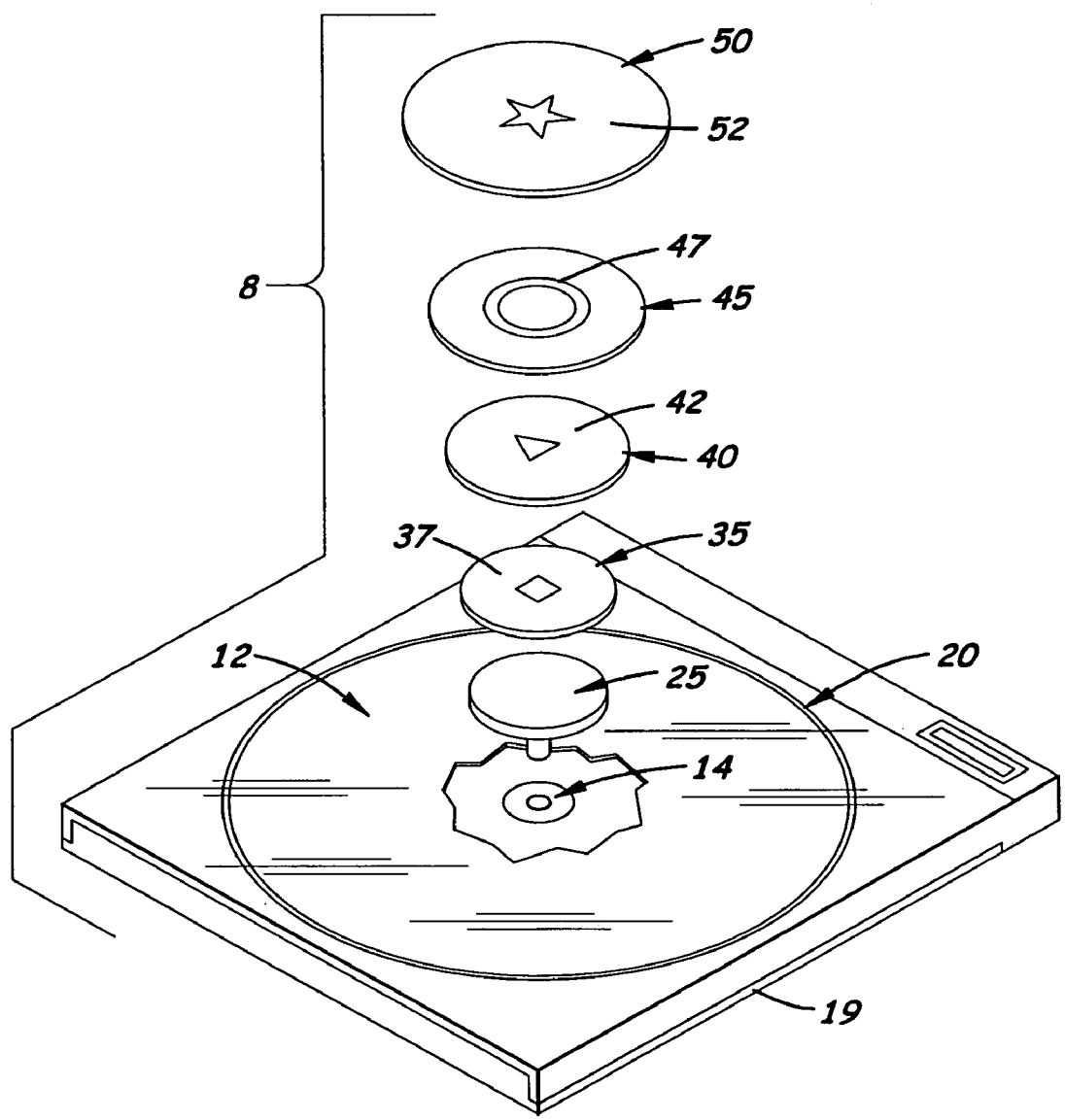
FIG. 1 is a perspective view of an optical disc media located in a jewel case with the marketing device showing in an exploded format that being attached to the media's spindle hole.
Figure 2:
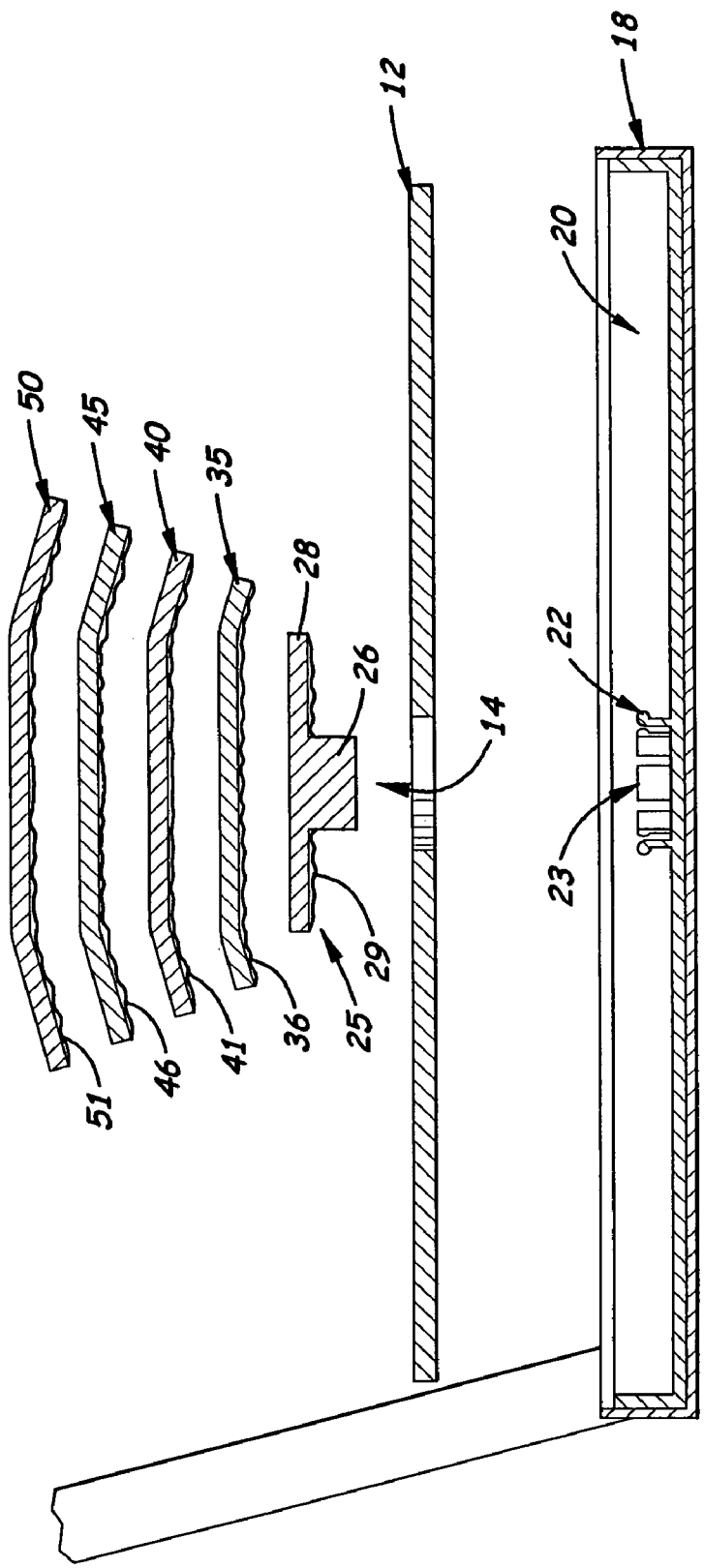
FIG. 2 is a top plan view of an optical disc media removed shown in FIG. 1 being inserted to a sleeve container.

Referring to the Figs., there is shown and described herein an optical disc media marketing system 8 that uses a standard optical disc 12 shipping inside a jewel case 18. The system 8 includes the attachment of a plurality of adhesive labels 35, 40, 45, and 50 that are co-axially aligned and stacked over the spindle hole 14 of the optical disc 12 that must be removed prior to the optical disc 12 being removed from the jewel case 18. The labels 35, 40, 45, and 50 are sufficient in diameter and become progressively smaller from top to bottom so that the top label overlaps the perimeter edge of a lower label. To remove the entire stack of labels, each exposed label must be individually manipulated by the user. By requiring the labels 35, 40, 45, and 50 be sequentially removed from the optical disc 12, the length of exposure of advertisements or other indicia 37, 42, 47, and 52 printed on the labels 35, 40, 45, and 50, respectively, is increased thus making it useful as an advertising tool.

The system 8 includes the use of a jewel case 18 with a recessed circular cavity 20 formed on its lower leaf 19. The cavity 20 is designed to receive a standard 4¾ inch diameter optical disc 12 with a co-axially aligned ⅝ inch diameter spindle hole 14 formed therein. Formed centrally inside the cavity 20 is a spindle post 22 designed to extend into the spindle hole 14 when the optical disc 12 is placed inside the cavity 20. Formed inside the spindle post 22 is central hole 23 that allows the spindle post 22 to compress and snap fit around the upper edge of the optical disc 12 to hold the optical disc 12 inside the cavity 20.

The system 8 includes the use of a means to physically hold the stack of labels 35, 40, 45, and 50 on the spindle post 22. In the first embodiment, the means to physically hold the stack of labels 35, 40, 45, 50 is a T-shaped adaptor 25 with a center stem 26 designed to extend through the hole 14 and engage the central hole 23 on the spindle post 22. Attached or integrally formed on center stem 26 is a perpendicularly aligned flat, circular plate 28. The diameter of the plate 28 is sufficiently larger than the spindle hole 14, so that the adaptor 25 must be removed from the spindle post 22 in order for the optical disc 12 may be removed from the jewel case 18. An optional adhesive layer 29 may be applied to the bottom surface of the plate 28 to adhesively attach the adaptor 25 to the optical disc 12.

Attached to the top surface of the plate 28 is at least one removable advertisement label 35 with a diameter larger than the plate 28. The label 35 is co-axially aligned over the plate 28 and slightly larger in diameter than the plate 28 so that the adhesive layer 36 on the label attaches to the optical disc 12. The label 35 must first be removed from the optical disc 12 and plate 28 in order for the optical disc 12 to be removed from the spindle post 22.

Stacked and co-axially aligned over the first label 35 is a plurality of secondary advertisement labels 40, 45, and 50 that are sequentially larger in diameter thereby requiring the user to remove the labels 35, 40, 45, and 50 in succession before removing the optical disc 12 from the jewel case 18. Each secondary label 40, 45 and 50 includes a lower adhesive layer 41, 46, and 51, respectively. In the preferred embodiment, the adhesive layers 41, 46, 51, extend to the outer perimeter of each label 40, 45, 50, respectively, so that the perimeter edge is adhesively attached to the optical disc 12. In the Figs., four secondary labels 40, 45, and 50 are shown. It should be understood that fewer or more secondary labels may be used.

Figure 3:
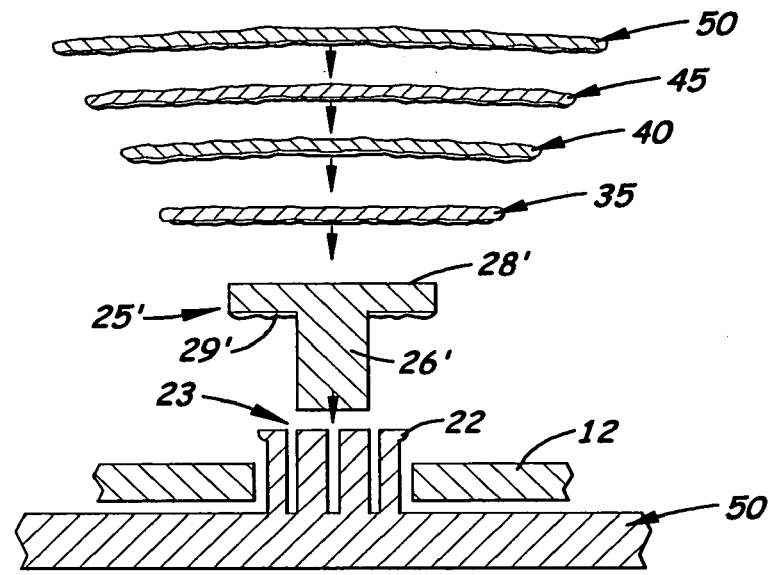
FIG. 3 is a partial, exploded, sectional side elevational view of the first embodiment of the device showing the relative position of four stacked advertisement labels attached over a T-shaped adapter that is inserted into the hole formed on the center post on a jewel case.

In a second embodiment, shown in FIG. 3, the T-shaped adaptor 25 is replaced with an alternative T-shaped adaptor 25' that uses a smaller diameter stem 26' that fits tightly into the spindle hole formed on the spindle post 22. The T-shaped adaptor 25' includes a flat plate 28' that presses downward against the top surface of the optical disc 12 to hold the optical disc 12 inside the jewel case 18. The labels 35, 40, 45, and 50 are then stacked above the plate 28'.

Figure 4:
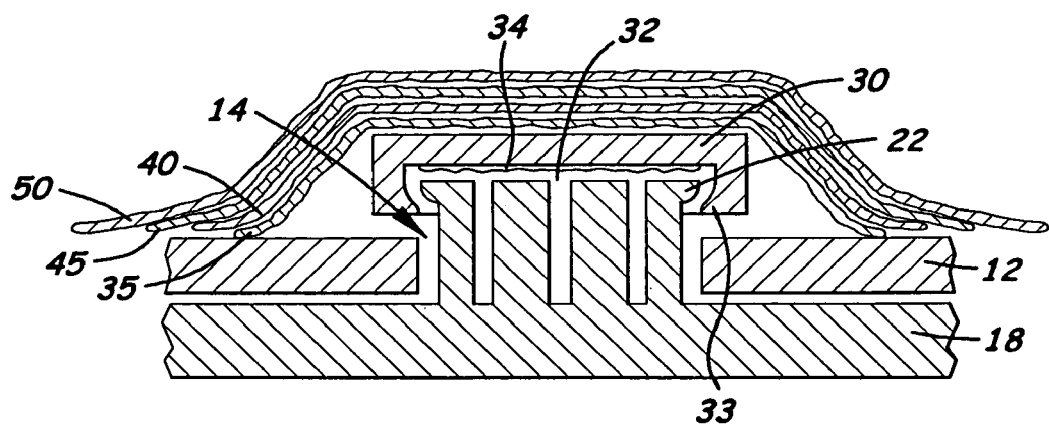
FIG. 4 is a partial, sectional side elevational view of the second embodiment of the device being attached to the portion of the center post formed on a jewel case showing it extending through the spindle hole and a cap attached thereto.

FIG. 4 shows a third embodiment of the system 8 includes a cap 30 that attaches to the upper portion of the spindle post 22 that extends above the optical disc 12 when the optical disc 12 is placed inside the jewel case 18. The cap 30 is a cylindrical shape and slightly larger in diameter than the disc hole 14. The cap 30 includes a lower bore 32 designed to receive the upper end of the spindle post 22. Formed on the lower edge of the cap 30 is an optional inward extending lip 33 designed to forcibly grip sides of the spindle post 22. An optional adhesive layer 34 may be applied to the bottom surface of the cap 30 to attach the cap 30 to the spindle post 22. The labels 35, 40, 45, and 50 are then stacked above the cap 30.

Figure 5:
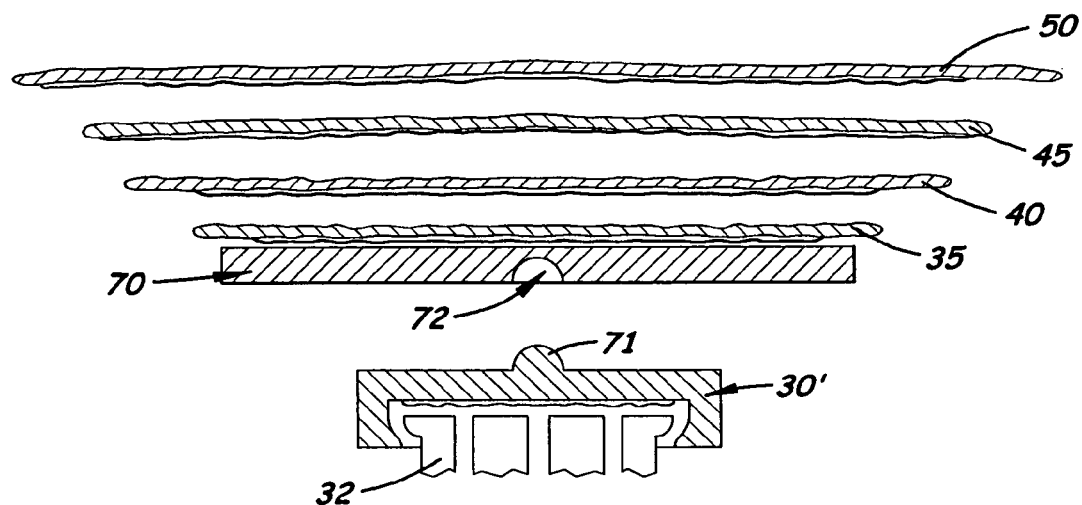
FIG. 5 is a partial, sectional side elevational view of the third embodiment of the invention that uses a spinning disc that attaches to a cap that attaches to the outer surface of the center post.

As shown in FIG. 5, is a fourth embodiment of the system that includes a rotating disc 70 disposed between the cap 30' and the bottom label 35. The disc 70 provides support for the bottom label 35. Disposed between the disc 70 and the cap 30 is an optional means for rotating the disc 70 over the cap 30. In the preferred embodiment, the means for rotating is a centrally located half-spherical hub 71 formed on the top surface of the cap 30' and the complimentary shaped recessed opening 72 formed on the bottom surface of the disc 70. When the hub 71 is snapped fitted into the opening 72, the disc 70 rotates freely over the cap 30'.

Figure 6:
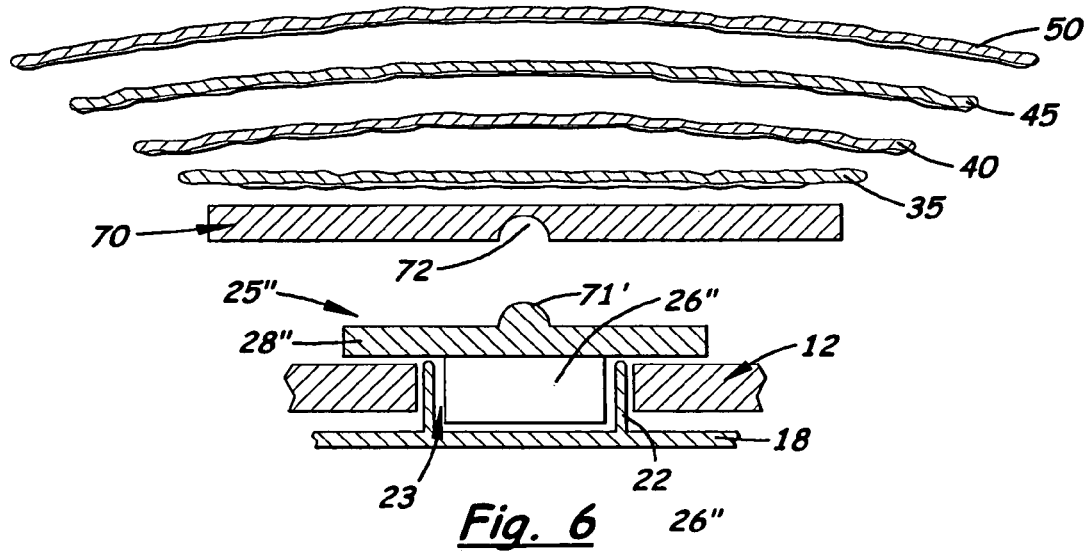
FIG. 6 is a partial, sectional side elevational view of the third embodiment of the invention in which the stem element is inserted into the spindle hole formed on the optical disc media.

FIG. 6 shows a fifth embodiment of the invention that uses a modified T-shaped adaptor 25" similar to the adaptor 25 shown in FIG. 3. Adaptor 25" includes a narrow stem 26" designed to fit snuggly into the center hole 23 formed on the spindle post 22. Attached to the plate 28" is an upward extending half spherical hub 71' that is inserted into a complimentary recessed opening 72 formed on the bottom surface of the disk 70.

Figure 7:
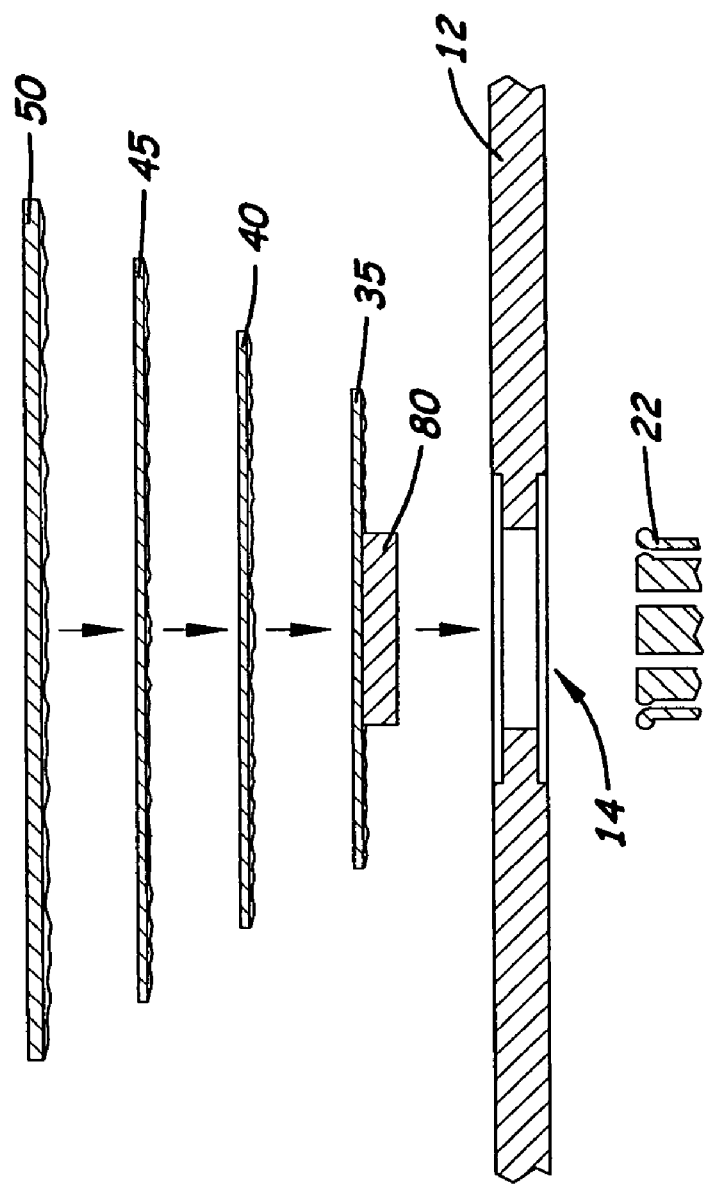
FIG. 7 is a fourth embodiment of the invention with uses two stacked labels coaxially aligned around the center axis of the spindle hole.

FIG. 7 shows a sixth embodiment of the system in which the adapter and cap are eliminated as a thick adhesive layer 80 is applied to the center area on the bottom layer 35. During use, the thick adhesive layer 80 extends into the spindle hole 14 on the disc 12 and may be attached to the spindle post 22 to hold the bottom layer 35 in position on the disc 12

In compliance with the statue, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An optical disc media marketing system, comprising:
   a. an optical disc jewel case, said jewel case including a cavity for receiving an optical disc;
   b. an optical disc disposed in said cavity located in said jewel case, said optical disc including a spindle hole; and,
   c. at least two stacked removable labels co-axially aligned over said spindle hole on said optical disc, said labels each including advertising indicia in a top surface and being adhesively attached and being consecutively smaller in size so that an upper label covers and hides the perimeter edge of a lower label thereby requiring the upper label to be removed from said optional disc before removing the lower label.

2. The optical disc media marketing system, as recited in claim 1, further including a spindle post formed inside said cavity on said jewel case that inserts into said spindle hole on said optical disc, and means for engaging said spindle post when inserted into said spindle hole to hold said optical disc on said spindle post.

3. The optical disc media marketing system, as recited in claim 2, wherein said means for engaging said spindle post is a T-shaped adaptor that engages said spindle post, said T-shaped adaptor including a flat plate that is disposed under the lowest stacked label.

4. The optical disc media marketing system, as recited in claim 3, wherein said spindle post includes a hole and said T-shaped adaptor includes a narrow stem that inserts into said hole to connect said T-shaped adapter to said spindle post.

5. The optical disc media marketing system, as recited in claim 2, wherein said means for engaging said spindle post is a thick layer of adhesive centrally aligned on the bottom surface of the lowest stacked label that extends downward through said spindle hole on said optical disc and presses against the top surface of said spindle post.

6. The optical disc media marketing system, as recited in claim 2, wherein said means for engaging said spindle post is a cylindrical cap larger in diameter than said spindle hole, said cap including a lower cavity that snap fits and receives the upper end of said spindle post to hold said optical disc on said spindle post.

7. The optical disc media marketing system, as recited in claim 6, further including a layer of adhesive located inside said lower cavity in said cap to adhesively attach said cap to said spindle post.

8. The optical disc media marketing system, as recited in claim 6, wherein said cap includes an inward extending lip that is engaged by said spindle post to hold said optical disc on said spindle post.

9. The optical disc media marketing system, as recited in claim 6, wherein said cap includes a center stem that extends into said hole formed on said spindle post to hold said cap on said spindle post.

10. The optical disc media marketing system, as recited in claim 9, further including a layer of adhesive located inside said lower cavity in said cap to attach said cap to said spindle post.

11. The optical disc media marketing system, as recited in claim 2 further including a rotating disc attached to said cap and under said stacked labels.

* * * * *